United States Patent [19]

Korte

[11] 4,163,502

[45] Aug. 7, 1979

[54] SHEET METAL CONNECTION IN ELONGATED LAMP HOUSINGS

[76] Inventor: Heinrich Korte, 60 Grosswolder Strasse, Ihrhove, Fed. Rep. of Germany, 2951

[21] Appl. No.: 864,969

[22] Filed: Dec. 27, 1977

[51] Int. Cl.² .......................... H02G 3/08; B65D 7/00

[52] U.S. Cl. .................................. 220/3.94; 220/4 R; 220/75

[58] Field of Search ........................ 220/4 R, 3.2, 3.94, 220/83, 309, 4 B, 4 E, 4 F, 75, 76, 67

[56] References Cited

U.S. PATENT DOCUMENTS

| | | | |
|---|---|---|---|
| 1,591,926 | 7/1926 | Mautner | 220/3.94 |
| 2,423,955 | 7/1947 | Widener | 220/75 X |
| 2,924,702 | 2/1960 | Block | 220/3.94 X |
| 3,592,956 | 7/1971 | Fork | 220/3.94 X |

*Primary Examiner*—William Price
*Assistant Examiner*—Steven M. Pollard
*Attorney, Agent, or Firm*—Allison C. Collard; Thomas M. Galgano

[57] ABSTRACT

In an elongated field lamp housing made of assembled sheet metal parts of the type including a U-shaped elongated lamp element, two U-shaped front faces joined to opposite ends of the lamp element and a generally U-shaped, elongated covering hood joined to the front faces and the lamp element, at least the front faces and the lamp element are provided with overlapping and abutting surfaces defining connecting zones. The front faces and the lamp element in these connecting zones have simultaneously-formed coacting indentations formed therein from one side of the connecting zone, for joining the front faces and lamp element together.

4 Claims, 3 Drawing Figures

SHEET METAL CONNECTION IN ELONGATED LAMP HOUSINGS

The invention relates to a sheet metal connection in elongated field lamp housings made of assembled sheet metal parts, preferably from an elongated, sheet metal, shaped lamp element, having sheet metal front faces at the ends thereof and a sheet metal covering hood for the lamp element.

In commonly known elongated field lamps, the lamp element, each sheet metal front face, and the covering hood consist of simple sections; for example, U-shaped sections, which are formed; for example, from bevelled sheet metal strips. The lamp element and each of the front face parts are prepared for receiving the electrical installations for the lamp. Thereafter, the final assembly is carried out wherein initially the lamp elements and the front faces are coupled together. Subsequently, the electrical installations are mounted. As a last working step, the cover hood is mounted on the lamp element in order to install the required electrical installations in a fluorescent lamp; for example, the coil and the fuse along with the wiring. For coupling the sheet metal front faces with the sheet metal section of the lamp element, it is known to use, rivets, screws or spot welding, although spot welding is the most-used coupling method. After the parts are connected, all parts are then lacquered. In order to eliminate this lacquering step, it is known to use pre-lacquered sheet metal parts for the lamp elements, the sheet metal front faces and the covering hoods; the prelacquered sheet metal strips being cut to size and bevelled. This method is made possible because of the use of plastic resin lacquers which are very stress resistant and are not damaged during the sheet metal shaping since they also bend as the sheet metal is bent into the desired shape.

However, with these prelacquered sheet metal lamp elements, it is not possible to couple the individual elements by means of spot welding, because the lacquer will be damaged due to the temperatures generated during spot welding. Therefore, a costly and time-consuming assembly by means of riveting or screw assembly has to be carried out. Consequently, the cost-saving advantages by using prelacquered sheet metal elements are eliminated due to the costly assembly process of riveting or screw assembly.

It is an object of the invention to provide a single sheet metal connection which can be easily assembled and which is preferably useable for lamp housings made of prelacquered sheet metal.

This object of the invention is achieved in that at least in the connection zone of the sheet metal parts, simultaneous recesses or depressions are made, from one side, in both sheet metal parts.

The recesses, for example, are provided into the outer surfaces of the outwardly disposed assembled sheet metal part by means of a suitable tool, forming a dent at the rear side of this sheet metal portion which, in turn, presses into the engaging face of the inwardly-disposed adjacent sheet metal portion, so that this portion is also provided with a dent on the rear side thereof. Preferably, the indentations (or recesses) are provided with a sufficient depth, such that so that the dents formed in the first outer sheet metal portion completely penetrates the inner second sheet metal portion. In order to provide even more rigid connections, a plurality of indentations may be provided. The outer first sheet metal portion is forcibly pushed through the inner second sheet metal portion and, due to the existing friction forces, a cold welding occurs at the cut out edges.

Preferably, each recess has the shape of a longitudinal groove. In this manner, the edges of the longitudinal groove form cut edges which either partially or completely cut the sheet metal part depending on the depth of the recesses. In view of the cut edges, tilting forces which may act on the front face portion may be absorbed by the connection. However, it is also possible to provide different type of shapes for the recesses. For example, a pyramidal type or truncated shape is possible. The recesses may be formed in the sheet metal portions by indenting either the inside or the outside of the abutting sheet metal portions.

Since the depth of each recess is about equal to the material thickness of at least one of the connecting sheet metal portions, the generated cut edges of the recesses form electrical contacts between the sheet metal parts which are required for grounding the lamp housing.

The inventive connection due to the recess is highly stress-resistant, so that additional screws or rivets are not required. Furthermore, the recesses formed by the indentations have the additional advantage that front face elements for covering the lamp elements may engage the same. Also, the reverse of engagement is possible. The front face elements may also be shaped as protrusions which engage the recesses which are provided in the covering hood. The covering hood is thereby connected with the lamp element in a simple manner and can be easily removed, whereby no screw connections have to be removed for removing the covering hood. The inventive elongated field lamp housing can be easily and inexpensively assembled when using prelacquered sheet metal particularly as a result that it eliminates the assembly steps for connecting the individual parts together. The storage of individual parts is facilitated because required connecting elements are not necessary.

One embodiment of the invention which shows further inventive features is shown in the drawing.

Other objects and features of the present invention will become apparent from the following detailed description when taken in connection with the accompanying drawing which discloses one embodiment of the invention. It is to be understood that the drawing are designed for purposes of illustration only, and are not intended as a definition of the limits and scope of the invention disclosed.

In the drawing wherein similar reference numerals denote similar elements throughout the several views.

Figure 1:
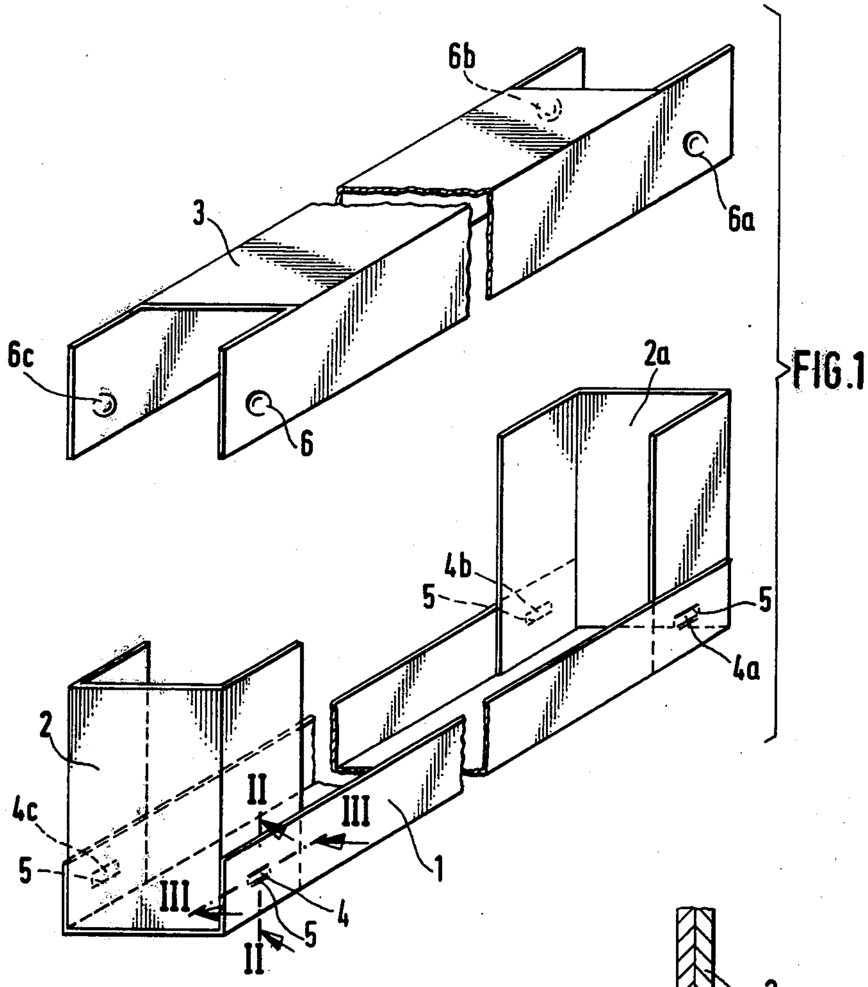
FIG. 1 is an exploded, perspective view of the front faces coupled with the lamp element and the mounted covering hood of an elongated lamp housing embodying the present invention.

FIG. 1 shows a perspective view of a lamp housing embodying the present invention. The lamp housing consists of a lamp element 1 which is fragmentarily illustrated. Lamp element 1 is made from a U-shaped sheet metal strip having bevelled edges. Front faces 2, **2*a* are attached to lamp element 1. Front faces, 2, 2a receive the sockets (not shown) for a fluorescent lamp. A covering hood 3 is provided which extends across the lamp element between front faces 2, 2*a*. In this embodiment, covering hood 2 is shown in the exploded view of FIG. 1, removed from lamp element 1. Lamp element 1 is connected with front faces 2, 2*a* by means of recesses or indentations 4,4*a*,4 *b*,4*c* formed in lamp element 1 from the outside and which penetrate into the walls of the associated front faces as shown at 4*c*. In this embodiment, the recesses are shown as longitudinal grooves, so that cut edges 5 are created with each recess. When covering hood 3 is pushed onto lamp element 1, it transgresses the connecting zones of the front faces with the lamp element by means of extended lateral wall zones. Protrusions 6,6*a*,6*b*,6*c* are formed in the lateral wall zones by by indentation of the walls from the outside and they engage within the corresponding recesses 4,4*a*,4*b*,4*c* on the outside of the lamp element 1**.

Figure 2:
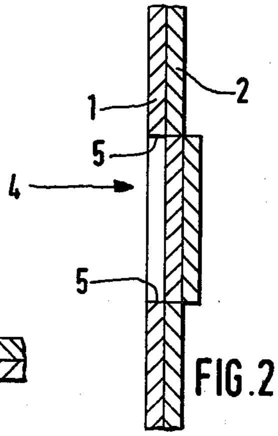
FIG. 2 is a vertical sectional view through a recess taken along line II—II of FIG. 1; and, FIG. 3 is a horizontal sectional view taken along line III—III of FIG. 1.
Figure 3:
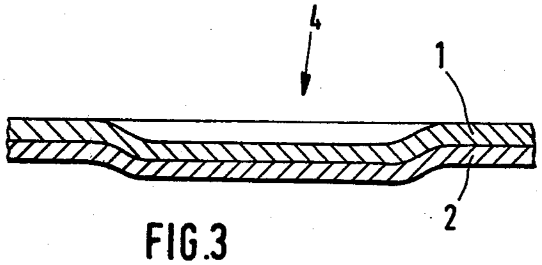

FIG. 2 shows a sectional view taken along the II—II of FIG. 1. In order to more clearly show the shape of the recesses FIGS. 2 and 3 are shown in an enlarged scale, with FIG. 3 showing a horizontal section taken along line III—III in FIG. 1.

While only one embodiment of the present invention have been shown and described, it will be obvious to those persons of ordinary skill in the art that many changes and modifications may be made thereunto without departing from the spirit and scope of the invention.

What is claimed is:

1. In an elongated fluorescent lamp housing made of assembled sheet metal parts of the type including a prelacquered elongated, generally U-shaped lamp element, two prelacquered, generally U-shaped front faces joined to opposite ends of the lamps element and a generally U-shaped, elongated covering hood joined to the front faces and the lamp element, the improvement comprising:

at least said front faces and said lamp element being provided with overlapping and abutting surfaces defining connecting zones, said front faces and said lamp element in said connecting zones having simultaneously-formed coacting indentations formed therein from one side of the connecting zone, for joining said front faces and lamp element rigidly together, said coacting indentations of said lamp element and said front faces each forming an unlacquered cut edge which abut one another so as to form electrical contacts between said front faces and said lamp element.

2. The housing according to claim 1, wherein said indentations are in the shape of longitudinally-extending recesses.

3. The housing according to claim 1, wherein the depth of said indentations is substantially equivalent to the material thickness of at least one of the joined sheet metal parts.

4. The housing according to claim 1, wherein said covering hood is provided with protrusions which engage within said indentations.

* * * * *